US010281025B2

(12) United States Patent
Sheridan

(10) Patent No.: US 10,281,025 B2
(45) Date of Patent: May 7, 2019

(54) FIXED SUPPORT AND OIL COLLECTOR SYSTEM FOR RING GEAR

(71) Applicant: UNITED TECHNOLOGIES CORPORATION, Hartford, CT (US)

(72) Inventor: William G. Sheridan, Southington, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 839 days.

(21) Appl. No.: 14/886,676

(22) Filed: Oct. 19, 2015

(65) Prior Publication Data

US 2017/0108110 A1    Apr. 20, 2017

(51) Int. Cl.
F16H 57/04    (2010.01)
F01D 25/18    (2006.01)
F02C 3/04    (2006.01)
F02C 7/36    (2006.01)
F16N 31/00    (2006.01)
F02C 7/06    (2006.01)
F01D 25/16    (2006.01)

(52) U.S. Cl.
CPC ......... F16H 57/0423 (2013.01); F01D 25/18 (2013.01); F02C 3/04 (2013.01); F02C 7/36 (2013.01); F16H 57/0486 (2013.01); F16N 31/00 (2013.01); F01D 25/164 (2013.01); F02C 7/06 (2013.01); F05D 2220/323 (2013.01); F05D 2220/36 (2013.01); F05D 2250/611 (2013.01); F05D 2260/40311 (2013.01); F05D 2260/602 (2013.01); F05D 2260/609 (2013.01); F05D 2260/98 (2013.01)

(58) Field of Classification Search
CPC .. F16H 57/0423; F16H 57/0486; F01D 25/18; F01D 25/164; F02C 3/04; F02C 7/36; F02C 7/06; F16N 31/00; F05D 2220/323; F05D 2220/36; F05D 2260/611; F05D 2260/40311; F05D 2260/602; F05D 2260/609; F05D 2260/98; F05D 2250/611
See application file for complete search history.

(56) References Cited

U.S. PATENT DOCUMENTS

| 5,433,674 A * | 7/1995 | Sheridan ............... F16H 1/2809 475/346 |
| 5,472,383 A | 12/1995 | McKibbin |
| 8,484,942 B1 | 7/2013 | McCune et al. |
| 8,572,943 B1 | 11/2013 | Sheridan |

(Continued)

FOREIGN PATENT DOCUMENTS

| EP | 3002433 | 4/2016 |
| EP | 3109412 | 12/2016 |

OTHER PUBLICATIONS

Extended European Search Report dated May 22, 2017 in European Application No. 16192463.4.

Primary Examiner — Jason D Shanske
Assistant Examiner — Joshua R Beebe
(74) Attorney, Agent, or Firm — Snell & Wilmer L.L.P.

(57) ABSTRACT

According to various embodiments, disclosed is a fixed support and gutter system for a ring gear of a turbine engine gear train, the fixed support and gutter system comprising a support structure having an undulating path which forms at least a portion of a gutter structure for capturing oil shed off the gear train.

13 Claims, 3 Drawing Sheets

(56) References Cited

U.S. PATENT DOCUMENTS

| | | |
|---|---|---|
| 8,678,743 B1 | 3/2014 | Sheridan et al. |
| 8,756,908 B2 | 6/2014 | Sheridan et al. |
| 8,777,793 B2 | 7/2014 | Sheridan |
| 8,813,469 B2 | 8/2014 | Sheridan |
| 8,814,494 B1 | 8/2014 | Sheridan et al. |
| 8,931,285 B2 | 1/2015 | McCune et al. |
| 9,068,629 B2 | 6/2015 | Sheridan |
| 2012/0088624 A1* | 4/2012 | Sheridan ................ F01D 25/16 475/159 |

* cited by examiner

FIXED SUPPORT AND OIL COLLECTOR SYSTEM FOR RING GEAR

BACKGROUND

A gas turbine engine featuring a geared turbofan architecture typically uses a planet style gear train having a stationary ring gear and flexible support systems for the ring gear. Such systems may typically use an oil collector system for capturing oil used to lubricate the gear train. The support system and oil collector system may be associated with added weight and cost associated with the planet style gear train.

SUMMARY

In accordance with various embodiments, disclosed is a planetary gear train for a geared turbofan engine with a fixed ring gear that integrates a flexible mount system and oil gutter collector.

According to various embodiments, disclosed is a fixed support and gutter system for a gear train of a turbine engine, the fixed support and gutter system comprising: a support structure coupled between at least one ring gear of the gear train and an engine case of the turbine engine; and a gutter structure; wherein the support structure comprises an undulating path forming at least a portion of the gutter structure integrated with the support structure, and wherein the gutter structure is configured to capture oil shed off the gear train. In one embodiment, the gutter structure comprises at least one discharge passage coupled to the gutter structure for conducting captured oil. In one embodiment, the gutter structure is positioned circumferentially around the gear train. In one embodiment, the gutter structure comprises a forward oil collector positioned forward of the gear train, and an aft oil collector, which is positioned aft of the gear train. In one embodiment, the fixed support and gutter system further comprises a fluid passage between the forward oil collector and the aft oil collector. In one embodiment, at least one of the forward oil collector and the aft oil collector is formed from the undulating path of the support structure. In one embodiment, the undulating path of the support structure forms one of the forward oil collector or the aft oil collector, wherein the other of the forward oil collector or aft oil collector does not form part of the support structure. In one embodiment, the undulating path of the support structure forms the aft oil collector. In one embodiment, the ring gear is positioned between the forward oil collector and the aft oil collector. In one embodiment, the undulating path is configured to accommodate flexing of the gear train. In one embodiment, the gear train is a planetary gear train comprising a sun gear, a plurality of planet gears, and a planet carrier. In one embodiment, the support structure is configured to allow the gear train to flex in an angular direction with respect to a centralized longitudinal axis, but to substantially restrain movement in a torsional direction.

According to various embodiments, disclosed is a fixed support and gutter system for a gear train of a turbine engine, the fixed support and gutter system comprising: a gutter structure configured to capture oil shed from the gear train; and a support structure coupled between at least one ring gear of the gear train and an engine case of the turbine engine where the support structure comprises an undulating path forming at least a portion of the gutter structure integrated within. In one embodiment, the support structure comprises first generally linear region parallel to a longitudinal centralized axis of the turbine engine, and a second generally linear region orthogonal to the longitudinal centralized axis, wherein the first generally linear region is coupled to the second generally linear region to form the portion of the gutter structure integrated with the support structure. In one embodiment, wherein the support structure further comprises at least one curvature including a first curvature between the first generally linear region and the second generally linear region, a second curvature between the second generally linear region and a third generally linear region parallel to the longitudinal centralized axis, and a third curvature between the third generally linear region and a fourth generally linear region orthogonal to the longitudinal centralized axis, wherein the first generally linear region is coupled to the ring gear, and the fourth generally linear region is coupled to the engine case.

According to various embodiments, disclosed is a turbine engine comprising: a gear train; a fixed support and gutter system supporting the gear train, comprising: a support structure coupled between at least one ring gear of the gear train and an engine case of the turbine engine; and a gutter structure; wherein the support structure comprises an undulating path forming at least a portion of the gutter structure integrated with the support structure, and wherein the gutter structure is configured to capture oil shed off the gear train. In one embodiment, the gas turbine engine is a high thrust geared turbofan engine. In one embodiment, the gas turbine engine further comprises a fan section, a compressor section, a combustor section, and a turbine section, wherein the fan section comprises a fan and a fan shaft, wherein the fan shaft is coupled to the fan through the gear train. In one embodiment, the gutter structure comprises a forward oil collector positioned forward of the gear train, and an aft oil collector, which is positioned aft of gear train. In one embodiment, the gutter structure comprises a discharge passage coupled to at least one of the forward oil collector and the aft oil collector.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
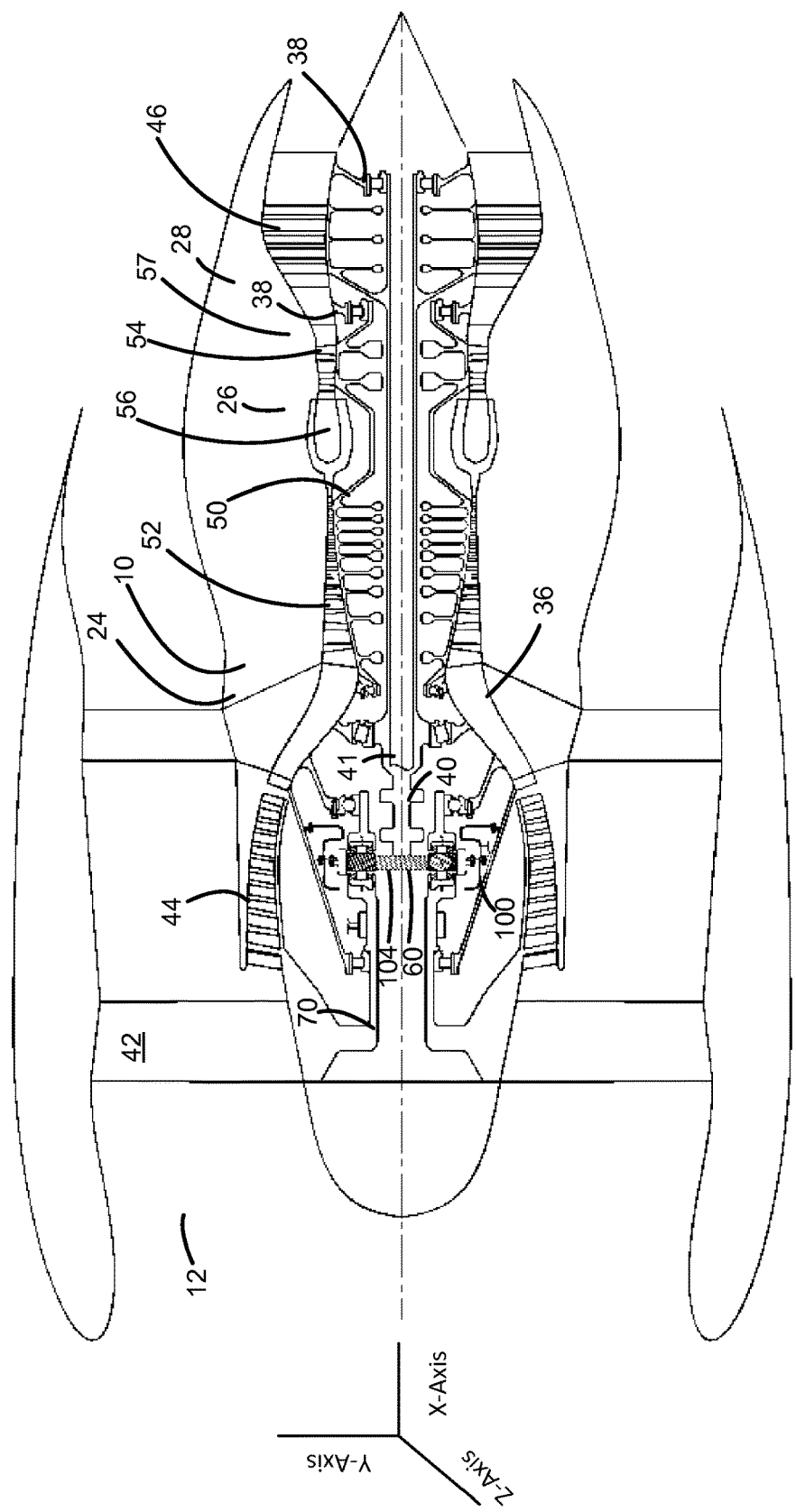
FIG. 1 shows a gas turbine engine incorporating a fixed support and gutter system, according to various embodiments.
Figure 2:
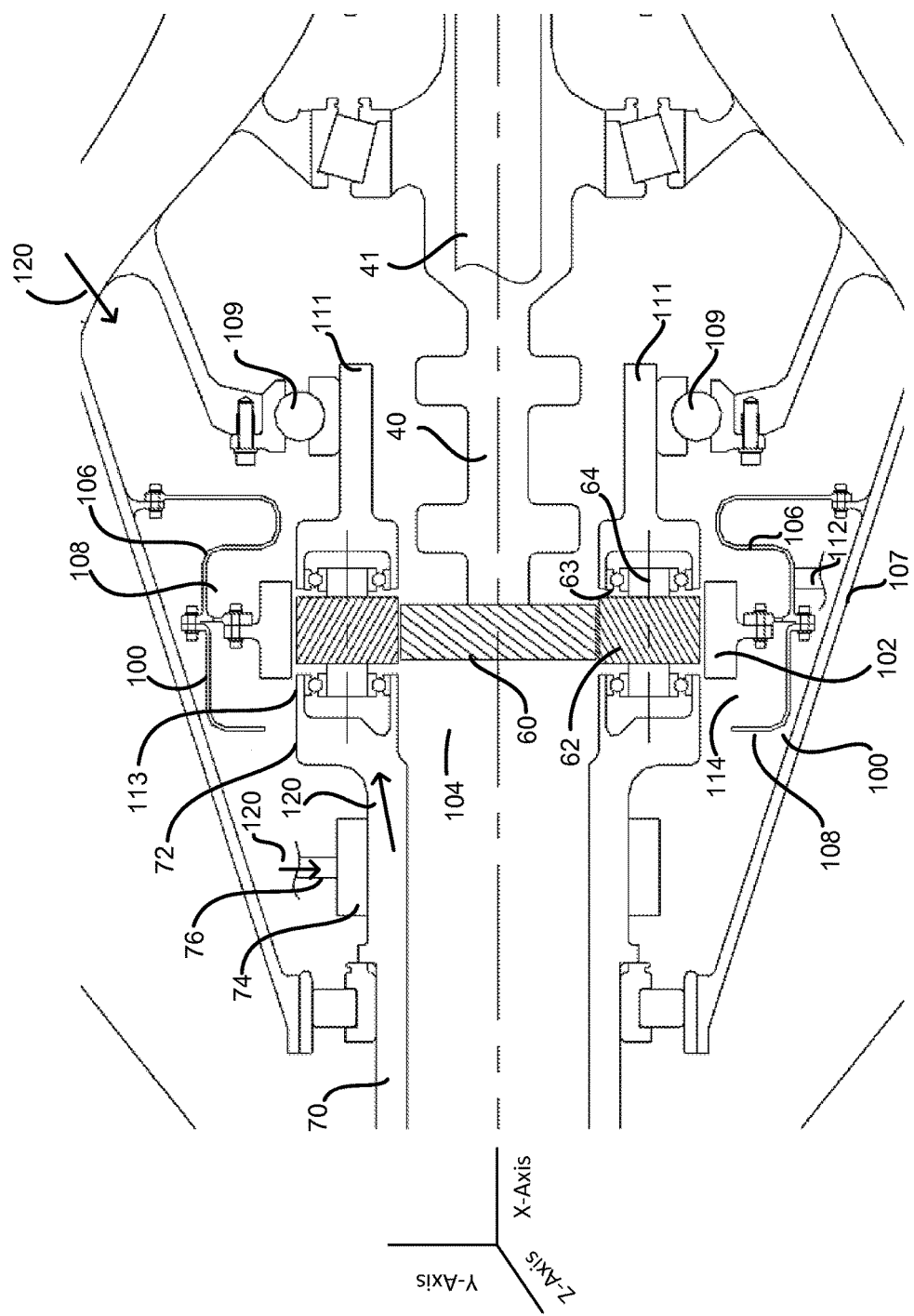
FIG. 2 is an enlarged view of a portion of the turbine engine of FIG. 1.
Figure 3:
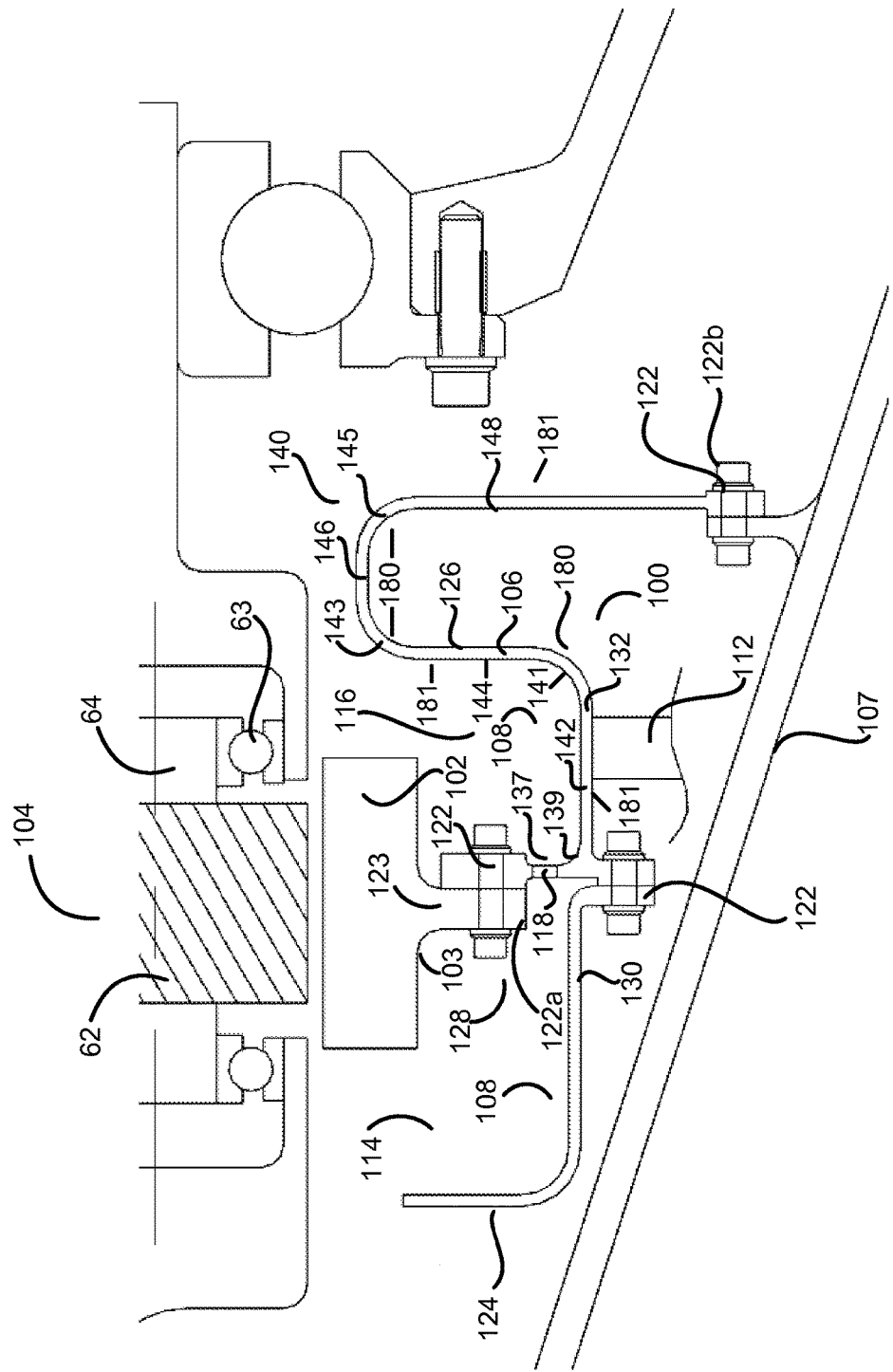
FIG. 3 is an enlarged view showing the fixed support and gutter system of FIG. 1.

In accordance with various embodiments, disclosed is a fixed support and gutter system 100 for a ring gear 102, which is a fixed ring of a gear train 104 of a turbine engine 10, as shown in FIG. 1. According to various embodiments, gear train 104 may generally comprise a sun gear 60, a plurality of planet gears 62, and a planet carrier 64, in addition to the ring gear 102, as shown in FIG. 2. According to various embodiments, the fixed support and gutter system 100 comprises a support structure 106, which is coupled between the ring gear 102 and an engine case 107, as shown in FIG. 3. According to various embodiments, the fixed support and gutter system 100 further comprises a gutter structure 108. According to various embodiments, support structure 106 comprises an undulating path 140 forming at least a portion of the gutter structure 108. Advantages of the disclosed fixed support and gutter system 100 may include reduction in material and structural components for turbine engine 10, resulting in reduced weight and expense.

According to various embodiments, support structure 106 provides a flexible support structure for ring gear 102 of gear train 104. According to various embodiments, support structure 106 is configured to allow gear train 104 to flex with respect to a centralized longitudinal axis, or the x-axis, but to substantially restrain movement in a torsional direction (i.e. rotational movement about the x-axis) of the gear train 104, thus resisting rotation of gear train 104, while accommodating parallel and angular misalignments. For example, the longitudinal axes of a planetary gear train's sun gear 60, planet carrier 64, and ring gear 102 are ideally coaxial with the x-axis. Such perfect coaxial alignment, however, is rare due to numerous factors including imbalances in rotating hardware, manufacturing imperfections, and transient flexure of shafts and support frames due to aircraft maneuvers. The resulting parallel and angular misalignments impose moments and forces on the gear teeth, the bearings which support the planet gears in their carrier, and the carrier itself. Support structure 102 is rigid with respect to torsion or rotation about x-axis but is compliant with respect to torsion about a vertical y-axis and a lateral z-axis and with respect to translation along all three axes, including misalignments in a horizontal plane and in a vertical plane parallel to the x-axis. (See U.S. Pat. No. 5,433,674, incorporated by reference herein in its entirety for all purposes). According to various embodiments, support structure 106 may provide support which is approximately five to ten times stiffer in the torsional direction about the x-axis than in the y-axis and z-axis depending on the elastic limits of the materials used. According to various embodiments, support structure 106 may comprise materials such as steel or stainless steel alloys.

According to various embodiments, and with reference to FIG. 3, the flexibility and support properties of support structure 106 is provided by undulating path 140 of support structure 106. According to various embodiments, curvatures 180 in undulating path 140 provide flexibility in the angular direction, and may mitigate stress imparted to the support structure 106 from the gear train 104, while generally linear regions 181 provide rigidity with respect to torsion.

According to various embodiments, undulating path 140 curves from a ring coupling region 137, which is orthogonal to the x-axis, to a first region 142 which is aligned with the x-axis, to a second region 144 orthogonal to the x-axis, to a third region 146, aligned with the x-axis, and to a fourth region 148, orthogonal to the x-axis, wherein ring coupling region 137, first region 142, second region 144, third region 146, and fourth region 148 are generally linear regions 181, as shown in FIG. 3. Curvatures in undulating path 140, comprising a coupling curvature 139 between the ring coupling region 137 and first region 142; a first curvature 141 between the first region 142 and second region 144; a second curvature 143 between the second region 144 and third region 146; and a third curvature 145 between the third region 146 and the fourth region 148, provide flexibility to the support structure 106 and minimize stress.

According to various embodiments, connectors 122, such as bolts for example, may secure ring gear 102 to engine case 107. According to various embodiments, a first connector 122a is coupled between an outer end 103 of ring gear 102 and ring coupling region 137, and a second connector 122b secures fourth region 148 to engine case 107. According to various embodiments, ring gear 102 may be coupled approximately at the center 123 of the ring gear 102 to connector 122, which may provide flexible support to equalize torsional forces imposed on the gear train 104. According to various embodiments, ring gear 102 may be coupled to connector 122 at an off center location of the ring gear 102.

According to various embodiments, undulating path 140 is also utilized to form at least part of the gutter structure 108, as shown in the figures.

According to various embodiments, gutter structure 108 collects and directs lubricant (oil) shed from the gear train 104. According to various embodiments, oil may be directed to the gear train 104 through oil paths 120, for example, through oil inlet tube(s) 76 provided in the engine case 107 and routed through oil transfer bearing(s) 74 (see FIG. 2).

According to various embodiments, gutter structure 108 is designed to catch at least 60% of the oil expelled from gear train 104. According to various embodiments, such oil may be projected tangentially, or reflect off the surface of the rotating gears, for example. According to various embodiments, gutter structure 108 is coupled to discharge passage 112, which may comprise a drain pipe, to conduct captured oil, which may be cleaned and/or cooled for recirculation. According to various embodiments, gutter structure 108 may be positioned circumferentially around gear train 104, wherein it may extend partially or entirely around gear train 104, according to various embodiments.

According to various embodiments, gutter structure 108 comprises a forward collector 114, positioned forward of the gear train 104, and an aft collector 116, positioned aft of gear train 104. According to various embodiments, discharge passage 112 is coupled to at least one of the forward collector 114 and aft collector 116. According to various embodiments, discharge passage 112 may be coupled to aft collector 116, as shown in the figures. According to various embodiments, an additional discharge passage 112 may be coupled to forward collector 114.

According to various embodiments, at least one of the forward collector 114 and aft collector 116 is formed from undulating path 140 of support structure 106. According to various embodiments, support structure 106 forms the aft collector 116, which is coupled to engine case 107, as shown in the figures.

According to various embodiments, gutter structure 108 comprises a forward gutter wall 124 and an aft gutter wall 126, wherein ring gear 102 is generally centralized between forward gutter wall 124 and an aft gutter wall 126. According to various embodiments, forward gutter wall 124 and aft gutter wall 126 are each substantially orthogonal to the x-axis. According to various embodiments, gutter structure 108 further comprises a forward gutter floor 130 adjacent the forward gutter wall 124, and an aft gutter floor 132 adjacent the aft gutter wall 126. According to various embodiments, forward gutter floor 130 and forward gutter wall 124 form an integral unit forming the forward collector 114; and aft gutter floor 132 and aft gutter wall 126 form an integral unit forming the aft collector 116.

According to various embodiments, forward gutter floor 130 and an aft gutter floor 132 may be substantially parallel to the x-axis. According to various embodiments, forward gutter floor 130 and an aft gutter floor 132 may be configured to gravitationally direct fluid to the discharge passage 112, and to that end may be angled with respect to the x-axis. According to various embodiments, a connect region 128 between ring gear 102 and at least one of the forward collector 114 and aft collector 116 may form an intermediary wall between forward gutter wall 124 and aft gutter wall 126. According to various embodiments, such connect region 128 may include opening 118 forming a fluid passage between forward collector 114 and aft collector 116.

According to various embodiments, undulating path 140 of support structure 106 may form at least one of forward collector 114 and aft collector 116. According to various embodiments, undulating path 140 of support structure 106 may form both forward collector 114 and aft collector 116, wherein both collectors may include a coupling to engine case 107. According to various embodiments, first region 142 and second region 144 of undulating path 140 may form the aft gutter floor 132 and aft gutter wall 126, respectively, forming the aft collector 116, which is coupled to the engine case 107, while forward collector is not coupled to the engine case 107, as shown in FIG. 2.

According to various embodiments, ring gear 102, forward collector 114, aft collector 116, and engine case 107 may be coupled via connectors 122. According to various embodiments, such components may be unitarily integrated (i.e., formed from one piece). For example, forward gutter floor 130 may be unitarily integrated with aft gutter floor 132, ring gear 102 may be integrated with forward gutter floor 130 and/or aft gutter floor 132, etc., according to various embodiments.

Based on the above disclosure, it should be apparent that support structure 106, including undulating path 140 may take various configurations, and may include any number of curvatures 180 and linear regions 181, according to various embodiments. Additionally, other components included in support structure 106 may contribute to the flexibility and rigid support properties, including components such as discharge passage 112, various types of linkages having appropriate flexibility and/or rigidity, etc., according to various embodiments.

According to various embodiments, gear train 104 may be any type of epicyclical gear structure, including a planetary gear train or other gear train, including spur, helical, etc., and ring gear 102 may comprise one or more than one piece (e.g., ring gear 102 can be split into two pieces with holes that lead to the collectors), according to various embodiments. According to various embodiments, planet gears 62 of gear train 104 can be mounted on any type of bearings, such as ball, roller, tapered roller or plain journal bearings.

FIG. 1 shows turbine engine 10, which is a gas turbine engine, incorporating fixed support and gutter system 100 for gear train 104.

According to various embodiments, turbine engine 10 may generally incorporate a fan section 12, a compressor section 24, a combustor section 26, and a turbine section 28. According to various embodiment's, turbine engine 10 may comprise an inner shaft 41 that interconnects a fan 42 through an input shaft 40, a first or a low pressure compressor 44 and a first or a low pressure turbine 46; an outer shaft 50 that interconnects a second or a high pressure compressor 52 and a second or a high pressure turbine 54. According to various embodiments, combustor 56 may be arranged between the high pressure compressor 52 and the high pressure turbine 54. According to various embodiments, a mid-turbine frame 57 of the engine static structure 36 is arranged generally between the high pressure turbine 54 and the low pressure turbine 46. According to various embodiments, the mid-turbine frame 57 further supports bearing systems 38 in the turbine section 28. According to various embodiments, the inner shaft 41 and the outer shaft 50 are concentric and rotate via bearing systems 38 about the x-axis which is collinear with their longitudinal axes. According to various embodiments, the core airflow may be compressed by the low pressure compressor 44 then the high pressure compressor 52, mixed and burned with fuel in the combustor 56, then expanded over the high pressure turbine 54 and low pressure turbine 46. According to various embodiments, the inner shaft 41 may connected to the fan 42 through gear train 104 to drive the fan 42.

According to various embodiments, sun gear 60 of gear train 104 is mounted to the input shaft 40 that is attached to the inner shaft 41. Accordingly, the sun gear 60 is driven by the input shaft 40. According to various embodiments, planet gears 62 surrounding the sun gear 60 are supported on bearings 63 by planet carrier 64, and planet carrier 64 is attached to a fan drive shaft 70 through a torque frame 72. According to various embodiments, ring gear 102, surrounding the planet gears 62 is mounted to the engine case 107 via support structure 106 allowing the gear train 104 to flex to allow for proper alignment between the various elements of the gear train 104 during operation.

According to various embodiments, gear train 104 may be located axially between a fan roller bearing 109 and a fan thrust bearing 111. According to various embodiments, the fan roller bearing 109 engages the fan drive shaft 70 and engine case 107. The fan thrust bearing 111 engages the engine case 107 and a support ring 113 attached to the torque frame 72.

According to various embodiments, gear train 104 may have a gear reduction ratio of greater than about 2.3 wherein the low pressure turbine 46 has a pressure ratio that is greater than about five. According to various embodiments, the engine bypass ratio may be greater than about ten (10:1), the fan diameter may be significantly larger than that of the low pressure compressor 44, and the low pressure turbine 46 may have a pressure ratio that is greater than about five 5:1, according to various embodiments. According to various embodiments, gear train 104 may have a gear reduction ratio of greater than about 2.3:1. It should be understood, however, that the above parameters are only exemplary of one embodiment of a geared architecture engine and that the present invention is applicable to other gas turbine engines including direct drive turbofans.

Additionally, though the turbine engine 10 shown in FIG. 1 is a geared turbofan wherein the low pressure compressor 44 is tied to the fan 42, other styles of geared turbofan engines can have the low pressure compressor mounted on the same shaft as the low pressure turbine or use a three spool architecture style, according to various embodiments. Additionally, though turbine engine 10 of shows the gear train 104 mounted between two fan bearings, it can be mounted on the fan shaft in a variety of ways using roller bearings, ball bearings, or tapered bearings, and the fan shaft bearings can be mounted forward, aft, or straddle the gear train 104. Additionally, each of the positions of the fan section 22, compressor section 24, combustor section 26, and turbine section 28, and gear train 104 may be varied. For example, gear train 104 may be located aft of combustor section 26 or even aft of turbine section 28, and fan section 22 may be positioned forward or aft of the location of gear train 104.

According to various embodiments, turbine engine 10 may be a geared turbofan including high thrust geared turbofan engine, which may include two and three spool embodiments. Alternative engines might include an augmentor section (not shown) among other systems or features, according to various embodiments.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A fixed support and gutter system for a gear train of a turbine engine, the fixed support and gutter system comprising:
    a support structure coupled between at least one ring gear of the gear train and an engine case of the turbine engine; and
    a gutter structure configured to capture oil shed from the gear train, the gutter structure comprising a forward oil collector positioned forward of the at least one ring gear and an aft oil collector positioned aft of the at least one ring gear, wherein the forward oil collector is positioned and configured such that oil shed in a radially outward and forward direction from the at least one ring gear impacts and is collected by the forward oil collector; wherein the aft oil collector is positioned and configured such that oil shed in a radially outward and aft direction from the at least one ring gear impacts and is collected by the aft oil collector;
    wherein the support structure comprises an undulating path forming at least a portion of one of the forward oil collector and the aft oil collector, wherein the at least one ring gear is positioned axially between the forward oil collector and the aft oil collector, wherein the other of the forward oil collector and the aft oil collector comprises a free end that is not directly coupled to the engine case.

2. The fixed support and gutter system of claim 1, the gutter structure comprising at least one discharge passage coupled to the gutter structure for conducting captured oil.

3. The fixed support and gutter system of claim 1, wherein the gutter structure is positioned circumferentially around the gear train.

4. The fixed support and gutter system of claim 1, further comprising a fluid passage between the forward oil collector and the aft oil collector.

5. The fixed support and gutter system of claim 1, wherein the undulating path of the support structure forms the aft oil collector.

6. The fixed support and gutter system of claim 1, wherein the undulating path is configured to accommodate flexing of the gear train.

7. The fixed support and gutter system of claim 1, wherein the gear train is a planetary gear train comprising a sun gear, a plurality of planet gears, and a planet carrier.

8. The fixed support and gutter system of claim 1, wherein the support structure is configured to allow the gear train to flex in an angular direction with respect to a centralized longitudinal axis, but to substantially restrain movement in a torsional direction.

9. A fixed support and gutter system for a gear train of a turbine engine, the fixed support and gutter system comprising:
    a gutter structure configured to capture oil shed from the gear train, the gutter structure comprising a forward oil collector and an aft oil collector; and
    a support structure coupled between at least one ring gear of the gear train and an engine case of the turbine engine where the support structure comprises an undulating path forming one of the forward oil collector and the aft oil collector, wherein the other of the forward oil collector and the aft oil collector is not directly coupled to the engine case;

wherein the support structure comprises a first generally linear region parallel to a longitudinal centralized axis of the turbine engine, and a second generally linear region orthogonal to the longitudinal centralized axis, wherein the first generally linear region is coupled to the second generally linear region to form the portion of the gutter structure integrated with the support structure;

wherein the support structure further comprises:
  a first curvature between the first generally linear region and the second generally linear region,
  a second curvature between the second generally linear region and a third generally linear region parallel to the longitudinal centralized axis, and
  a third curvature between the third generally linear region and a fourth generally linear region orthogonal to the longitudinal centralized axis;

wherein the first generally linear region is coupled to the ring gear, and the fourth generally linear region is coupled to the engine case.

10. A turbine engine comprising:
a gear train;
a fixed support and gutter system supporting the gear train, comprising:
  a support structure coupled between at least one ring gear of the gear train and an engine case of the turbine engine; and
  a gutter structure configured to capture oil shed from the gear train, the gutter structure comprising a forward oil collector and an aft oil collector, wherein the forward oil collector is configured such that oil shed in a radially outward and forward direction from the at least one ring gear impacts the forward oil collector, wherein the aft oil collector is configured such that oil shed in a radially outward and aft direction from the at least one ring gear impacts the aft oil collector;
    wherein the support structure comprises an undulating path forming one of the forward oil collector and the aft oil collector, wherein the other of the forward oil collector and the aft oil collector does not form part of the support structure such that it is not directly coupled to the engine case.

11. The gas turbine engine of claim 10 wherein the turbine engine is a geared turbofan engine.

12. The turbine engine of claim 10, further comprising a fan section, a compressor section, a combustor section, and a turbine section, wherein the fan section comprises a fan and a fan shaft, wherein the fan shaft is coupled to the fan through the gear train.

13. The turbine engine of claim 10, the gutter structure comprising a discharge passage coupled to at least one of the forward oil collector and the aft oil collector.

* * * * *